(12) United States Patent
Aiken

(10) Patent No.: US 12,402,572 B1
(45) Date of Patent: Sep. 2, 2025

(54) TILTED PLANT GROWING SYSTEM AND METHOD

(71) Applicant: John Edward Aiken, Monroeville, PA (US)

(72) Inventor: John Edward Aiken, Monroeville, PA (US)

( * ) Notice: Subject to any disclaimer, the term of this patent is extended or adjusted under 35 U.S.C. 154(b) by 0 days.

(21) Appl. No.: 19/037,254

(22) Filed: Jan. 26, 2025

Related U.S. Application Data

(63) Continuation-in-part of application No. 18/772,501, filed on Jul. 15, 2024, now Pat. No. 12,239,063.

(51) Int. Cl.
*A47G 7/04* (2006.01)
*A01G 9/02* (2018.01)

(52) U.S. Cl.
CPC .................. *A01G 9/024* (2013.01)

(58) Field of Classification Search
CPC .......... A01G 9/024; A47G 7/04; A47G 7/044; A47G 2007/048; A47G 7/045; A47G 7/047; A47G 7/042; B65D 21/062; B65D 23/108; B65D 25/32; B65D 25/2802; B65D 25/2811; B65D 25/282
See application file for complete search history.

(56) References Cited

U.S. PATENT DOCUMENTS

| | | | | |
|---|---|---|---|---|
| 98,291 A * | 12/1869 | Nashold | ................. | A47G 19/14 220/775 |
| 484,824 A * | 10/1892 | Shilling | ................. | B65D 25/32 220/212.5 |
| 1,024,841 A * | 4/1912 | Emery | ..................... | A47K 1/09 248/113 |
| 1,193,585 A * | 8/1916 | Martindale | ............ | B65D 25/42 220/772 |
| 1,572,548 A * | 2/1926 | Mattison | ................ | A47G 7/047 47/67 |
| 2,564,043 A * | 8/1951 | Ward | ....................... | A47J 45/10 248/113 |
| 4,506,475 A * | 3/1985 | Elliott | ..................... | A47G 7/047 47/67 |
| 4,791,755 A | 12/1988 | Bilstein | | |
| 4,823,433 A * | 4/1989 | Curtis | ..................... | B44D 3/14 220/759 |
| 4,956,937 A * | 9/1990 | Haddox | ................. | A47G 7/047 248/323 |
| 4,993,767 A * | 2/1991 | Song | ....................... | A47J 45/10 220/759 |
| 5,333,409 A | 8/1994 | Mendes et al. | | |
| 5,529,193 A | 6/1996 | Hytonen | | |
| 6,863,191 B2 * | 3/2005 | Kesling | ................. | B44D 3/123 220/736 |

(Continued)

*Primary Examiner* — Kristen C Hayes

(57) ABSTRACT

The present hanging system for growing a potted vegetable plant to an extraordinary unsupported height is generally a tilted open-top liquid-impervious container with a rim adjacent the open top, and an optional soil-containing water-permeable inner container. The liquid-impervious outer container hangs from four elongated suspension members with two adjacent ones 3-9 centimeters longer than the other two so as to tilt the open-top water-impervious container when hung such that the plane of its bottom is tilted at an angle of 20 to 40 degrees from horizontal. The system also incorporates means to hang the container via the suspension members from an elevated structure.

1 Claim, 5 Drawing Sheets

(56) References Cited

U.S. PATENT DOCUMENTS

| | | | |
|---|---|---|---|
| 6,941,698 B2 * | 9/2005 | Telles | A47G 7/047 |
| | | | 248/318 |
| 9,931,887 B2 * | 4/2018 | Eberly, Jr. | B44D 3/14 |
| 2009/0158653 A1 | 6/2009 | Oliver | |
| 2018/0168114 A1 * | 6/2018 | McMurray | A01G 9/12 |
| 2021/0330099 A1 * | 10/2021 | Reiger | A47G 7/045 |

* cited by examiner

TILTED PLANT GROWING SYSTEM AND METHOD

CROSS-REFERENCE TO RELATED APPLICATIONS

This application claims is a continuation in part of U.S. Utility patent application Ser. No. 18/752,501 filed Jul. 15, 2024.

FIELD OF THE INVENTION

The present invention relates, in general, to container growing of plants and, more particularly, this invention relates to an improved hanging system for growing vegetables, especially tomatoes.

PRIOR ART

Otake in U.S. Pat. No. 5,829,193 teaches an inner plant container inside an outer semi-spherical container hung by chains. This along with many others are water permeable, and the plant grows up vertically only. Oliver in US published application 2009/0158653 discloses a hanging tomato plant growing container with a bottom aperture that also allows the plant to grow out the bottom, but the container inhibits upward growth. Also, water can leak out the bottom. Mendes in U.S. Pat. No. 5,333,409 discloses a hanging tomato-growing container with side tubes angled downward with plants growing out of each. This, as is the case with Oliver and others, suffers from the serious drawback of how to initially transplant a tomato plant into it. Planting seeds is out of the question. McMurray in U.S. Patent Application 2018/0168114 discloses a system for incorporating a trellis into a non-tilting hanging-plant pot and utilizing alternating short and long strands with the longer strands being more than 40% longer than the shorter ones. The short ones are used to suspend the plant pot and the longer ones form part of the trellis. What McMurray teaches would be unusable for achieving what the present invention does.

BACKGROUND OF THE INVENTION

Prior to the conception and development of the present invention, gardeners growing tomatoes had a few problems facing them. Most have been growing them in a plot of soil. Supporting the plants off the ground as they grow taller is one concern, and there have long been commercial products and patents addressing that. There are cages of all sorts, poles with ties, and other structures. Weeds have been another problem for in-ground growers. A third problem that appears to be getting worse in recent years is attacks by animals, mostly deer and groundhogs. Fencing is the most common "solution", but that creates an additional expense and maintenance issue. Also, groundhogs can go under fences and deer can sometimes reach or jump over them. A fourth problem is maintaining adequate moisture.

Container growing of tomatoes has become more popular, and a myriad of products, many expensive, are now on the market. There have been articles and products teaching growing from the side or bottom of a container, such as the TopsyTurvy®. These suffer from two major deficiencies in that much of the water added to the container escapes shortly out the bottom or side, and getting the tomatoes planted securely into the container without damage is another issue. Clearly, it would be advantageous to have an apparatus or system addressing all the major problems of support, animal protection, weeds, and water supply.

SUMMARY OF THE INVENTION

The present invention overcomes limitations, deficiencies, and cost issues of the prior art by providing means of growing a wide variety of tall vegetable plants in a container configured to tilt. The present growing system for a potted vegetable plant is a generally liquid-impervious container which is supported by attaching at least four elongated suspension members adjacent the outer edge of the outer container, at least two of which are longer within a specific range than the other two elongated suspension members such as to create a tilt of the outer container.

In an alternative embodiment, there is an optional water-permeable inner container for containing planting medium, such as soil. The system also incorporates means to hang the invention from an existing elevated structure (part of the overall system). In all embodiments, the elongated suspension members are one of chains, ropes, cords or straps with clips or hooks on at least one end.

OBJECTS OF THE INVENTION

It is, therefore, one of the primary objects of the present invention to provide a low-cost system for growing tomato plants especially to extraordinary heights in a container without cages, poles, ties, nets or the like.

Another object of the present invention is to provide a portable system for growing tomatoes that can be started indoors then moved outside, and later could still be moved back indoors.

Still another object of the present invention is to provide a system for growing plants in hanging containers with an option to provide a substantial reservoir of water.

Yet another object of the present invention is to provide a plant-growing system that inherently offers protection from most animals without fences, nets, or the like.

An additional object of the present invention is to provide a versatile system for growing a variety of plants in locations close to apartments or other residences lacking an available plot of soil.

In addition to the various objects and advantages of the present invention described with some degree of specificity above, it should be obvious that additional objects and advantages of the present invention will become more readily apparent to those persons who are skilled in the relevant art from the following more detailed description of the invention, particularly, when such description is taken in conjunction with the attached drawing figures.

Figure 1:
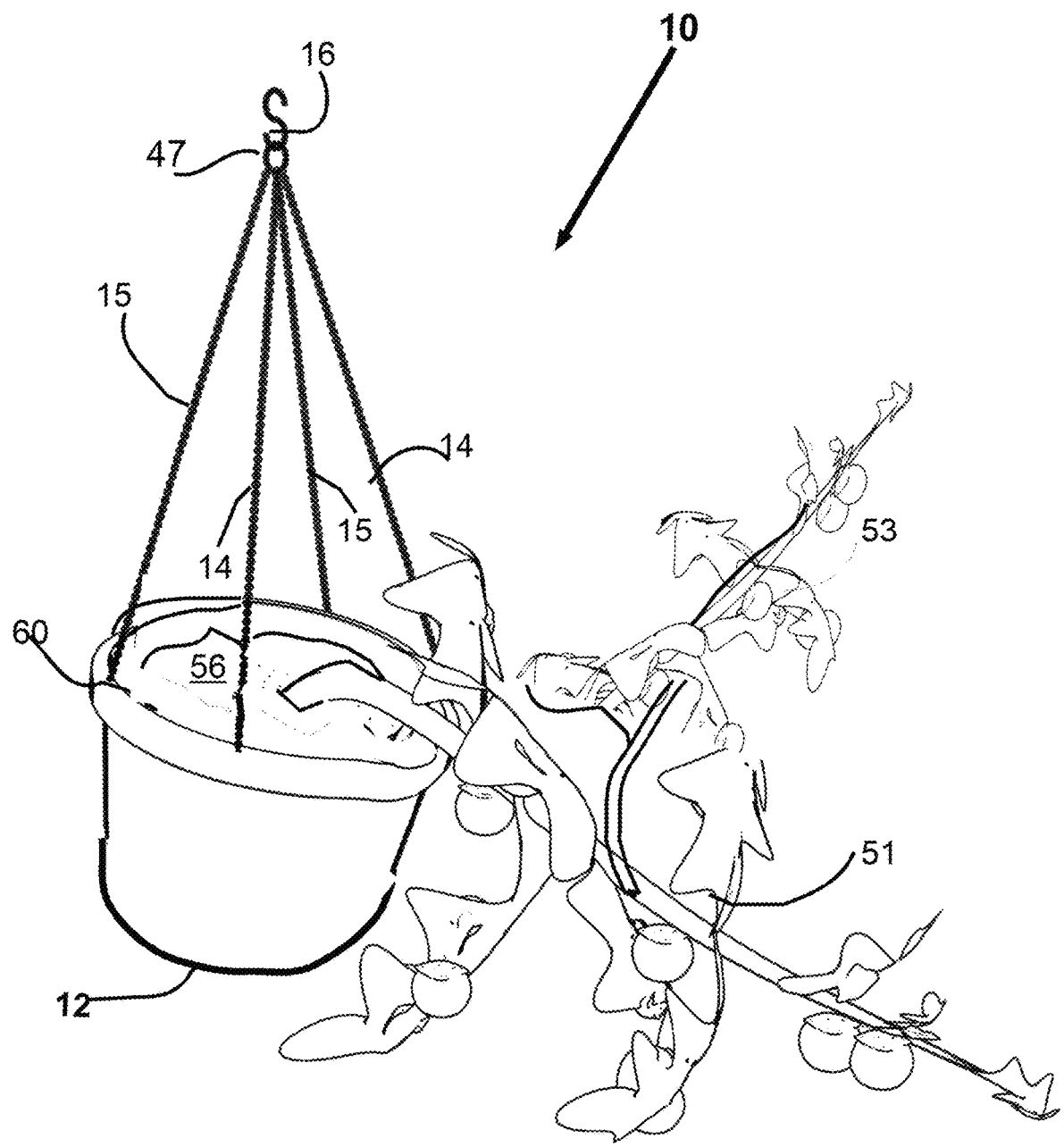
FIG. 1 provides a perspective view of a preferred embodiment of the present invention.

DETAILED DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, very similar components which have identical functions have been identified with identical reference numerals throughout the several views illustrated in the drawing figures.

Referring initially to FIG. 1, this provides a perspective view of a preferred embodiment of the present invention generally shown as 10. An open-top water-impervious bowl-like container 12, holds a quantity of plant soil 56 just below the upper rim 60. The container 46 may have either a rounded bottom or flat bottom. There are 4 suspension members with two adjacent suspension members 14 being longer than the two other adjacent suspension members 15. Chains will be the most common type of suspension member, but other cords, ropes, etc. would be acceptable. For proper functioning and desired plant growth pattern, it is important that the length of suspension members 14 be between 3 and 9 centimeters greater than that of suspension members 15. Thus, when the container 12 is lifted or suspended by the elongated suspension members, chains 14 and 15, it automatically becomes tilted at an angle in the desired range. One manner of hanging is with a common connecting member such as an S hook or ring 16 that can be connected above to a structure or a bracket. Typically, the ring or hook can engage with a chain through one or more of the many links in the chain (elongated suspension member) to alter the distance from the ring or hook to the rim 60 of the open-top water-impervious container 12. The tilt angle is important, especially for tomato plants, so that it is sufficient to promote downward growth first and upward growth later from the main stem. However, too much tilt can cause soil and water to flow out, which would be undesirable for multiple reasons.

Figure 2:
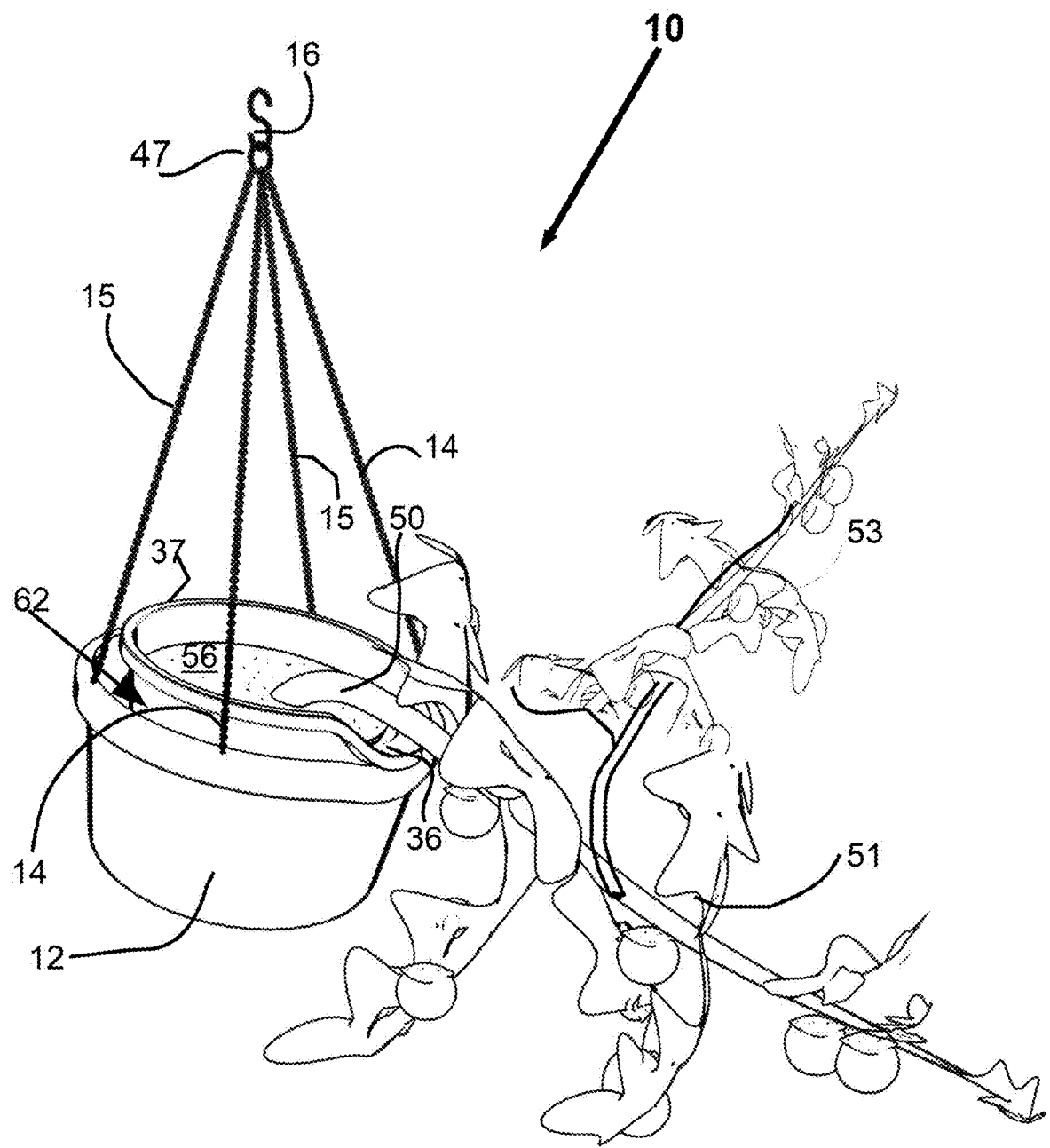
FIG. 2 is a perspective view of an alternative embodiment similar to that of FIG. 1.

FIG. 2 is a perspective view of a secondary embodiment of the present invention. A water-impervious open-top container 12 supports and surrounds an inner water-permeable container (plant pot) 37 which holds the soil 56 and plant 50. The container 12 and means of hanging it are configured so as to hang in a tilted position with the two suspension members (chains) 14 that are closer to the front container notch 36 being longer than the back side chains 15 by about 4 to 9 cm. The four chain lengths generally start the same, but the two adjacent one 15 then are shortened by using different links in the chain. They must be adjacent to obtain the proper tilt. For this embodiment, the number of suspension members must be at least four, and a typical length is about 50 centimeters. Typical for most potted plants is three suspension members, but in the present case, at least four are needed for supporting the weight but mainly for obtaining the desired tilt. The difference in chain lengths is such that the bottom plane of the outer container is at a 20 to 40 degree angle to horizontal. As growth progresses, there is a downward-growing portion 51 while still enabling significant vertical growth 53. Such a growth pattern was unexpected and is associated with having the proper range of tilt. The water-impervious container 12 is sized such that there is a substantial reservoir 62 for water that can be drawn into the soil for the plant 50.

Figure 3:
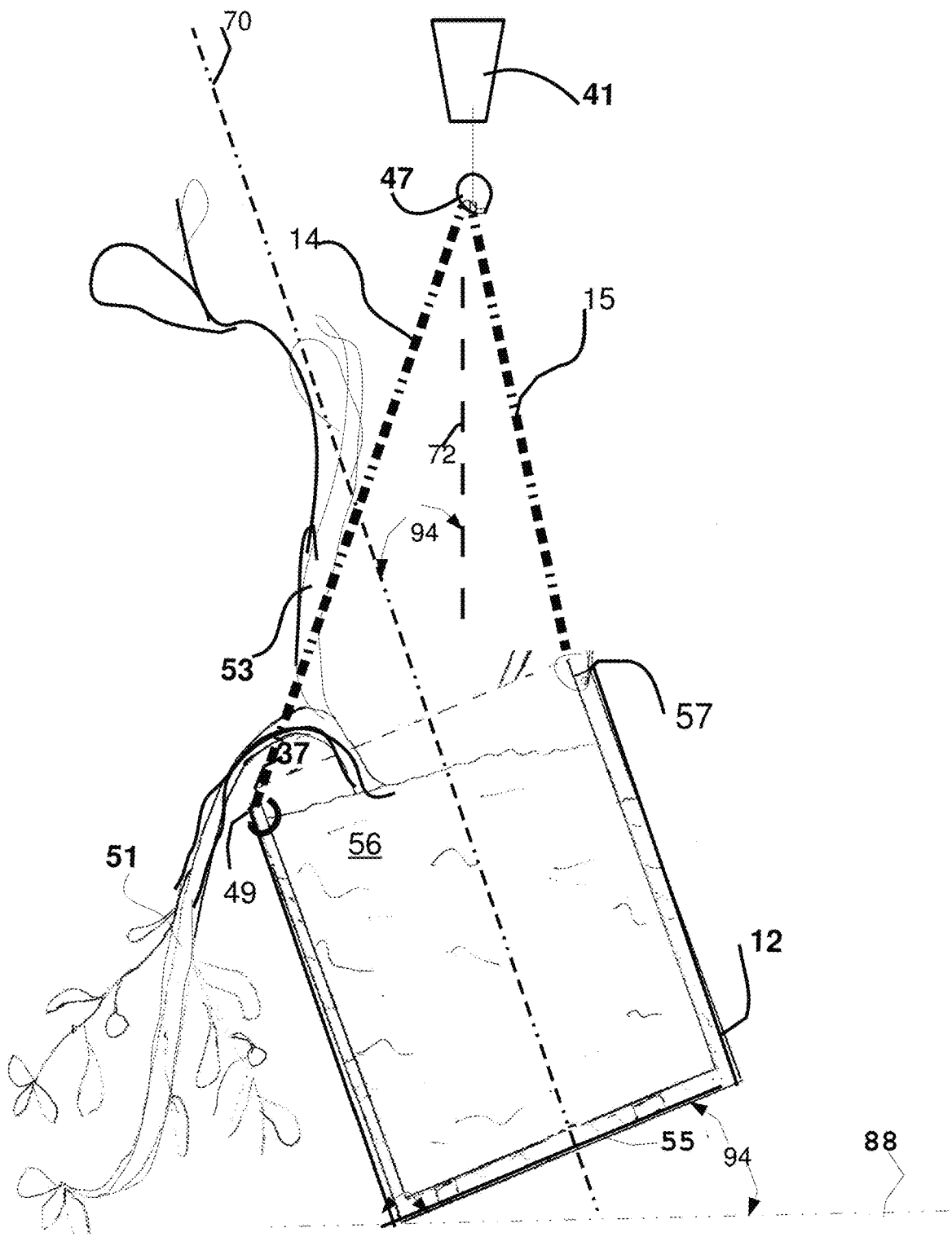
FIG. 3 is a sectional elevation view showing certain details of the present invention.

FIG. 3 provides a sectional elevation view of the means for achieving the tilting configuration of the water-impervious container 12. The soil 56 is contained within the water-impervious container 12. It can also be seen how the tilt of the container 12 promotes both the unexpected upward plant growth 51 and downward growth 53. When suspended, the plane of the container bottom 55 is at an angle 95 between 20 and 40 degrees from the horizontal, which is set and maintained by the length of the longer chains (suspension members) 14 attached at the rim 49 being 3-9 centimeters longer than the shorter ones 15. The angle would be the same from a centerline 70 of the open-top water-impervious container to a plumb line 72. If the water-impervious container is convex, then the angle with the horizontal is a center tangent line. An exemplary method of supporting the present system is with the upper ends of the suspension members 14 and 15 engaged with an S hook connected to a ring 47 at the end of a retractable pulley 41. The top ring of the pulley 41 is hung from a bracket, or a hook, nail, or screw up on an elevated structure (not shown or part of invention). The retractable pulley 41 makes it convenient to normally keep the plant up high away from animals and also to lower it for maintenance, watering, or harvesting.

Figure 4:
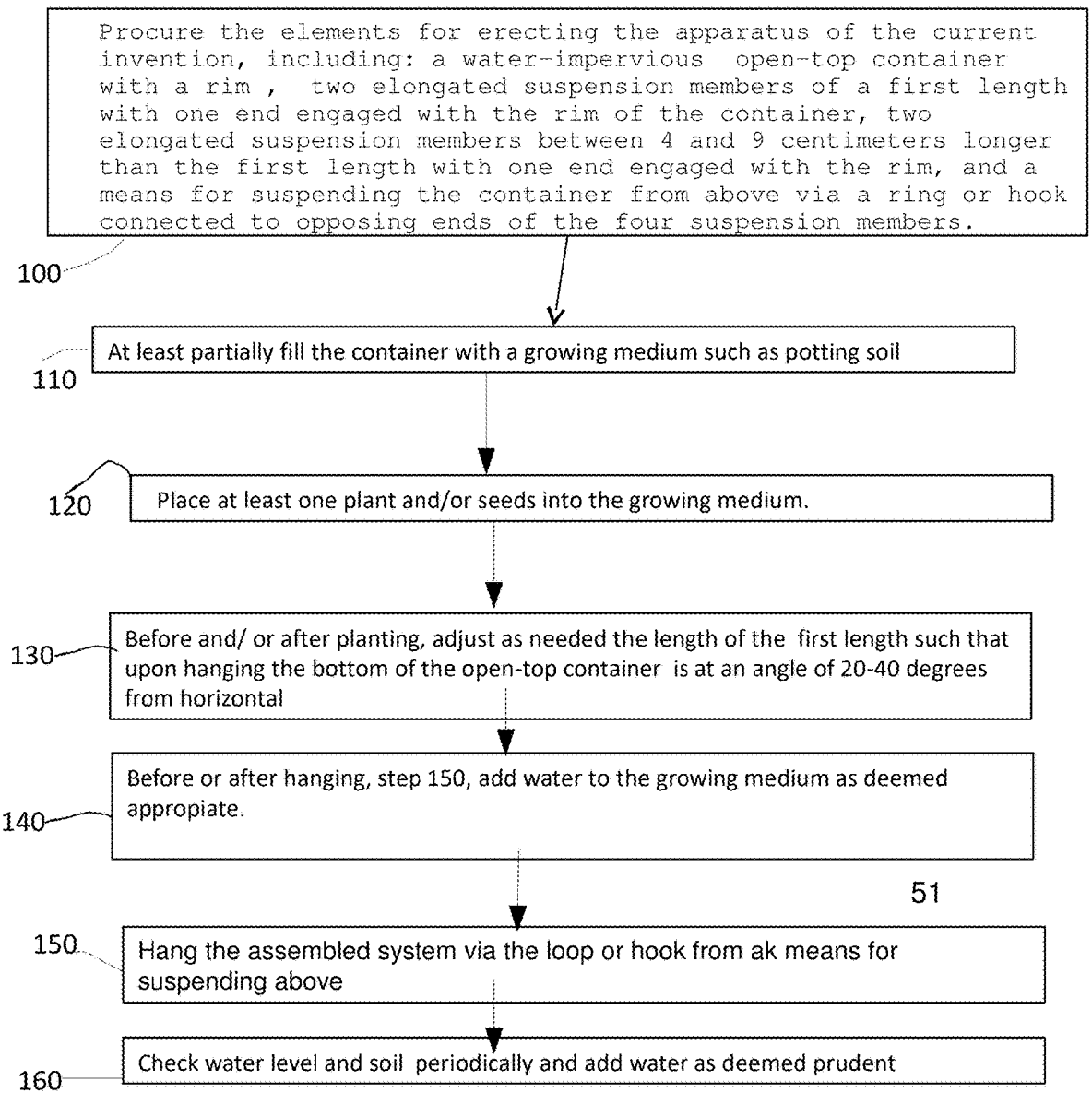
FIG. 4 provides a flow diagram for a basic method of use incorporated into the present invention.

FIG. 4 provides a flow diagram for a method of use incorporating the element of the system utilizing four suspension members (e.g. chains) of the present invention. It begins with a water-impervious container being suspended by four chains, two shorter than the other by 4 to 9 centimeters. The plant may be purchased already in a water-permeable pot with growing medium, or it can be subsequently planted in soil within a water-permeable container placed within the supported water-impervious container.

Figure 5:
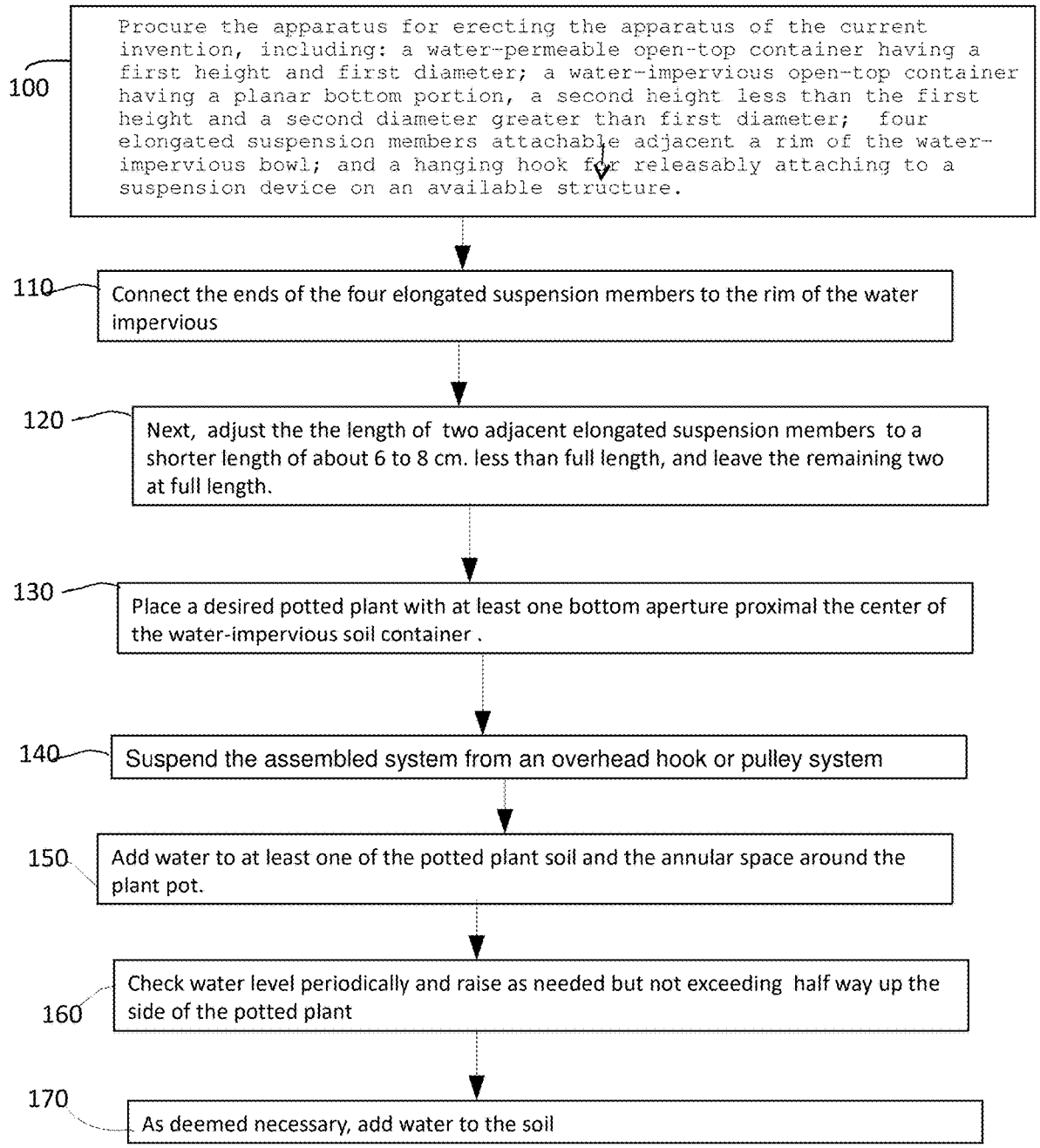
FIG. 5 provides a flow diagram for an alternative method of use incorporated into the present invention.

FIG. 5 provides a flow diagram for a variation of the alternative method based on the same basic elements of the FIG. 4 method, but also including a water-permeable inner container that can rest within the open-top water-impervious container. This inner container is to be filled at least partially with soil or other growing medium (step 110). Before or after planting (step 120), the inner container is placed inside the water-impervious container (step 130). The four suspension members are then attached with one end at the rim of the open-top water-impervious container. The other ends of the suspension members then converge at and are connected to a ring or hook such that two adjacent suspension members are 3 to 0 centimeters longer than the other two. The plant may be watered at 140, and then the system is hung by available means (step 150). There are occasional maintenance steps thereafter (steps 160-170).

While a presently preferred and various alternative embodiments of the present invention have been described in sufficient detail above to enable a person skilled in the relevant art to make and use the same, it should be obvious that various other adaptations and modifications can be envisioned by those persons skilled in such art without departing from the spirit of the invention.

I claim:
1. A method for erecting a tilted hanging plant container comprising the steps of;
procuring an open-top water-impervious container with a rim adjacent the open top, and at least four elongated suspension members, plus a ring or hook enagageable with the elongated suspension members;
attaching the elongated suspension members at one end to the rim of the open-topwater-impervious container;

attaching opposite ends of the four suspension members to the ring or hook such that two adjacent elongated suspension members are at a distance that is 3 to 9 centimeters less than two other suspension member; and hanging the open-top water-impervious container via the ring or hook from an existing oeverhead structure.

* * * * *